No. 738,007. PATENTED SEPT. 1, 1903.
O. B. DAWSON.
PROCESS OF REDUCING MINERALS.
APPLICATION FILED APR. 16, 1903.
NO MODEL.
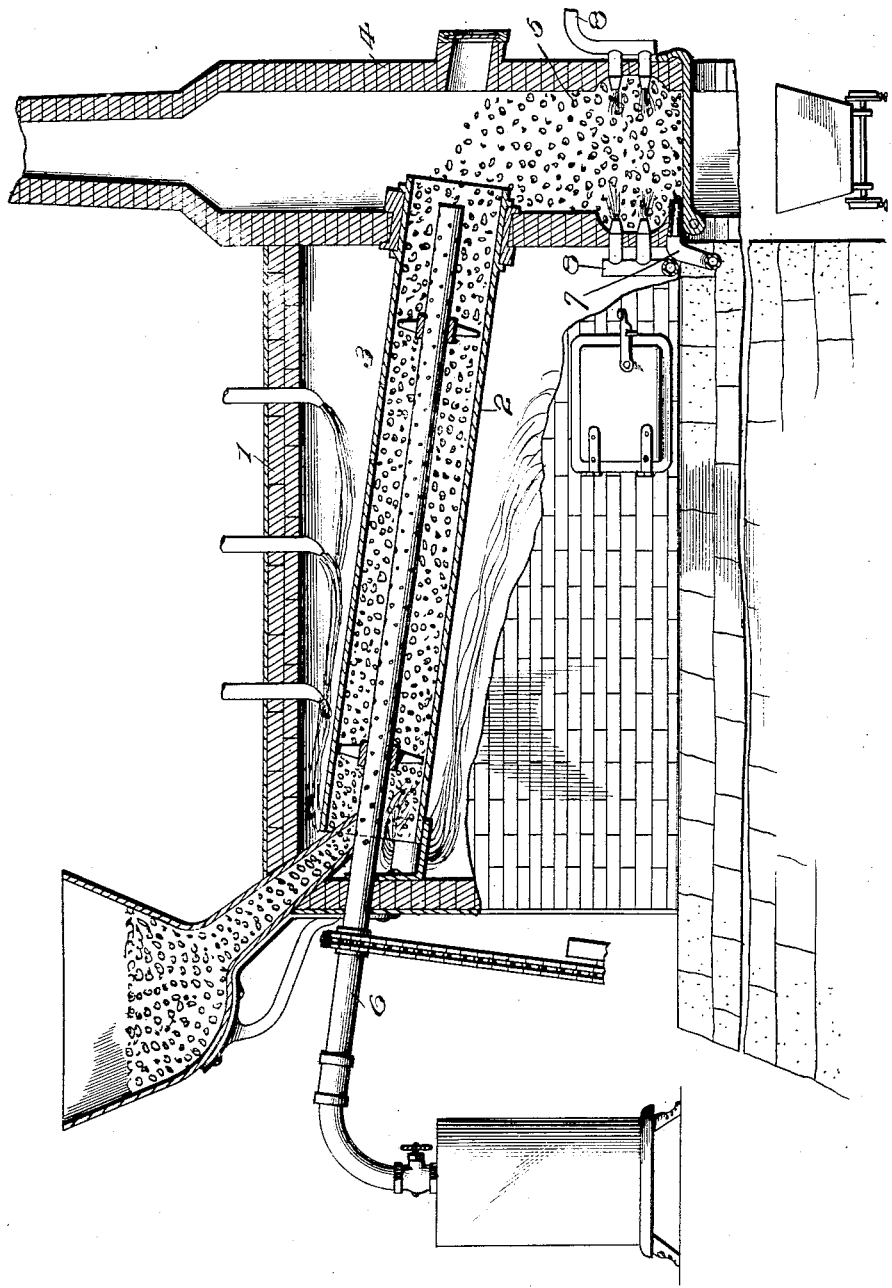
Witnesses: Inventor
Oliver B. Dawson.
By Attorney No. 738,007. Patented September 1, 1903.

UNITED STATES PATENT OFFICE.

OLIVER B. DAWSON, OF CALDWELL, NEW JERSEY.

PROCESS OF REDUCING MINERALS.

SPECIFICATION forming part of Letters Patent No. 738,007, dated September 1, 1903.

Application filed April 16, 1903. Serial No. 152,856. (No specimens.)

*To all whom it may concern:*

Be it known that I, OLIVER B. DAWSON, of Caldwell, in the county of Essex and State of New Jersey, have invented certain new and useful Improvements in Processes of Reducing Minerals; and I do hereby declare the following to be a full, clear, and exact description of the invention, such as will enable others skilled in the art to which it appertains to make and use the same.

The object of this invention is to provide an improved process for reducing and concentrating minerals in the ore into globular, shot-like masses or nuggets, and in which under a continuous feed the ore is first reduced to a metallic spongy condition without allowing the formation of metallic salts and then concentrated and formed into an approximately globular mass of metal within the gangue.

I am enabled to carry out this process by excluding air and introducing practically pure hydrogen gas for taking off all oxygen, so as to prevent the formation of metallic salts—such as oxids, carbonates, chlorids, sulfids, &c.—and hydrogenizing the elements naturally combined with and extracted from the metals. The ore in its natural state and without any flux is passed through a reducing-chamber, where it is subjected to a degree of heat about equal to that of the beginning of incandescence—that is, about 1,000° Fahrenheit—the heat being applied externally. While the ore is thus being heated in the reducing-chamber and in the presence of the products of combustion arising from the externally-applied heat, which products intermingle with the ore, substantially pure hydrogen gas is introduced for the purpose of combining with the sulfur, the oxygen, and other metalloids present in the minerals. The amount of hydrogen must be slightly in excess of the amount necessary to combine with these metalloids, so that if oxygen should enter with the products of combustion it will combine with the hydrogen gas, preventing the formation of oxids. The hydrogen has a stronger affinity for oxygen than it has for the metals, and it will also take from carbon dioxid part of its oxygen, thereby forming a reducing-gas and at the same time prevent the formation of metallic carbonates, &c. The gases being thus driven off by combining with the hydrogen the gangue becomes cellular, permitting the hydrogen gases to readily and effectively commingle with the minerals, and thereby reduce them to a metallic spongy condition. Because of the excess in the supply of hydrogen gas there is always sufficient present to maintain the metals in this spongy condition. While still heated and in this spongy condition, the metals pass into a practically air-tight concentrating-chamber, still in the presence of hydrogen, where they are subjected to a slightly higher degree of heat than that required in the reducing-chamber. The metals being thus fused collect in approximately globular masses after the form of shot or nuggets and may subsequently be readily removed from the fragile gangue by crushing. Of course, owing to the necessity of the presence of oxygen for the promotion of the combustion necessary to effect the heating of the ores in the reducing-chamber, a certain amount of $CO$ or $CO_2$ will have a tendency to intermingle with the ores; but by reason of the excess supply of hydrogen gas no oxids can be produced. All of the mineral is reduced to a metallic state, the hydrogen gas combining with all the sulfur, oxygen, and other gases or metalloids given off by the minerals. The amount of hydrogen gas present being in excess of that required for combining with and carrying off the gases mentioned enters into the cellular gangue, and thereby freely acts upon the minerals, keeping them in a metallic spongy condition. The gangue is thus made cellular by reason of the withdrawal and consumption of the gases naturally and previously combined with the minerals.

Although my process is applicable to the treatment of various minerals, yet I have found it most advantageous in the treatment of copper-bearing ores and the like.

In the accompanying drawing I have shown in vertical section an apparatus specially applicable for carrying out my process, such apparatus being embraced by my pending application for Patent Serial No. 146,602, filed March 6, 1903.

1 designates the furnace-casing of approximately air-tight construction; 2, the reducing-chamber, which is open at one end to the combustion-chamber 3, its other end opening into the smoke-stack 4, in the bottom of which is the concentrating-chamber 5. The pipe for introducing the hydrogen-gas into the reducing-chamber is indicated at 6, while the pipe 7 introduces gas into the concentrating-chamber, the heating medium for the latter being brought in by pipes 8.

I claim as my invention—

1. The herein-described process for effecting the direct decomposition of minerals, and the conversion of the same into globular shot-like masses or nuggets consisting in subjecting the ores without the addition of any flux thereto, and while atmospheric air is excluded therefrom, to a continuously-applied external heat for heating the ores to about the degree of beginning of incandescence in the presence of hydrogen gas supplied in quantity in excess of that required for hydrogenizing the elements naturally and previously combined with and extracted from the metals, such excess gas serving to maintain the metal in a metallic spongy condition and preventing the formation of oxides, carbonates, &c., and while still in a metallic, spongy condition, and in the presence of hydrogen gas concentrating the metals in the gangue to globular, shot-like masses or nuggets by subjecting them to a still higher degree of heat in a practically air-tight chamber.

2. The herein-described process for effecting the direct decomposition of minerals, and the conversion of the same into globular, shot-like masses or nuggets consisting in subjecting the ores, without the addition of any flux thereto and while atmospheric air is excluded therefrom, to a continuously-applied external heat for heating the ores to about the degree of beginning of incandescence in the presence of hydrogen gas, together with the products of combustion, such hydrogen gas being supplied in quantity in excess of that required for hydrogenizing the elements naturally and previously combined with and extracted from the metals, such excess gas serving to maintain the metal in a metallic spongy condition and preventing the formation of oxides, carbonates, &c., and while still in a metallic, spongy condition, and in the presence of hydrogen gas concentrating the metals in the gangue to globular shot-like masses or nuggets by subjecting them to a still higher degree of heat in a practically air-tight chamber.

In testimony whereof I have signed this specification in the presence of two subscribing witnesses.

OLIVER B. DAWSON.

Witnesses:
GRAFTON L. McGILL,
FRANCIS S. MAGUIRE.